(12) United States Patent
Hirota

(10) Patent No.: US 7,207,186 B2
(45) Date of Patent: Apr. 24, 2007

(54) REFRIGERATION CYCLE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 10/879,359

(22) Filed: Jun. 30, 2004

(65) Prior Publication Data

US 2005/0011221 A1  Jan. 20, 2005

(30) Foreign Application Priority Data

Jul. 18, 2003  (JP)  ............................. 2003-276389

(51) Int. Cl.
  *F25B 27/00*  (2006.01)
(52) U.S. Cl. ...................... 62/228.3; 62/500
(58) Field of Classification Search ................. 62/191, 62/225, 500, 503, 509, 512, 324.6, 228.3
See application file for complete search history.

(56) References Cited

U.S. PATENT DOCUMENTS

| | | | | |
|---|---|---|---|---|
| 3,447,339 A | * | 6/1969 | Rietdijk | 62/500 |
| 3,456,456 A | * | 7/1969 | Rietdijk | 62/500 |
| 3,464,230 A | * | 9/1969 | Rietdijk | 62/500 |
| 3,488,678 A | * | 1/1970 | Wagner | 62/503 |
| 3,496,735 A | * | 2/1970 | Haisma | 62/500 |
| 4,480,964 A | * | 11/1984 | Skinner | 417/222.2 |
| 4,484,457 A | * | 11/1984 | Mugele | 62/500 |
| 4,674,957 A | * | 6/1987 | Ohta et al. | 417/222.2 |
| 4,815,943 A | * | 3/1989 | Kawashima et al. | 417/222.2 |
| 5,343,711 A | * | 9/1994 | Kornhauser et al. | 62/116 |
| 5,493,875 A | * | 2/1996 | Kozinski | 62/503 |
| 6,443,708 B1 | * | 9/2002 | Hirota | 417/222.2 |
| 6,449,971 B1 | * | 9/2002 | Kimura et al. | 62/228.3 |
| 6,453,685 B2 | * | 9/2002 | Ota et al. | 62/115 |
| 6,453,688 B1 | * | 9/2002 | Ijiri | 62/153 |
| 6,467,291 B1 | * | 10/2002 | Takano et al. | 62/228.3 |
| 6,550,265 B2 | * | 4/2003 | Takeuchi et al. | 62/324.2 |
| 6,574,987 B2 | * | 6/2003 | Takeuchi et al. | 62/500 |
| 6,606,873 B2 | * | 8/2003 | Takeuchi | 62/191 |

(Continued)

FOREIGN PATENT DOCUMENTS

EP  1 134 517  9/2001

(Continued)

OTHER PUBLICATIONS

European Search Report dated Nov. 17, 2004 for European patent application No. 04 01 6144.

*Primary Examiner*—Mohammad M. Ali
(74) *Attorney, Agent, or Firm*—Westerman, Hattori, Daniels & Adrian, LLP.

(57) ABSTRACT

A variable displacement compressor driven by an engine, such as an engine for driving an automotive vehicle is used as a compressor, and the capacity of the compressor is controlled by a capacity control valve such that the differential pressure between discharge pressure and suction pressure of refrigerant becomes equal to a predetermined differential pressure determined by an external signal. Pressure substantially equal to pressure applied across the compressor is applied across the ejector, and therefore to control the differential pressure across the compressor is to control the differential pressure across the ejector. A differential pressure valve disposed between a gas-liquid separator and an evaporator is set to a differential pressure approximately proportional to the differential pressure across the ejector.

17 Claims, 14 Drawing Sheets

U.S. PATENT DOCUMENTS

| | | | |
|---|---|---|---|
| 6,640,562 B2 * | 11/2003 | Odachi et al. | 62/133 |
| 6,729,149 B2 * | 5/2004 | Takeuchi | 62/191 |
| 6,786,703 B2 * | 9/2004 | Breindel et al. | 417/222.2 |
| 2004/0055326 A1 | 3/2004 | Ikegami et al. | 62/500 |
| 2004/0069011 A1 | 4/2004 | Nishide et al. | 62/500 |

FOREIGN PATENT DOCUMENTS

| | | |
|---|---|---|
| EP | 1 300 638 | 4/2003 |
| JP | 2000-283577 | 10/2000 |
| JP | 2001-132650 | 5/2001 |
| JP | 2002-022295 | 1/2002 |
| JP | 2002-22295 | 1/2002 |
| JP | 2002-106978 A * | 4/2002 |
| JP | 2002-211236 | 7/2002 |
| JP | 2002-349978 | 12/2002 |
| JP | 2003-74992 | 3/2003 |
| JP | 2003-75030 A * | 3/2003 |
| JP | 200-114063 A * | 4/2003 |

* cited by examiner

REFRIGERATION CYCLE

CROSS-REFERENCES TO RELATED APPLICATIONS, IF ANY

This application claims priority of Japanese Application No. 2003-276389 filed on Jul. 18, 2003 and entitled "REFRIGERATION CYCLE".

BACKGROUND OF THE INVENTION (1) Field of the Invention

The present invention relates to a refrigeration cycle, and more particularly to a refrigeration cycle using an ejector in which the refrigeration cycle is applied to an automotive air conditioner.

(2) Description of the Related Art

Conventionally, an ejector cycle formed by using an ejector is known in the field of refrigeration cycles for use in refrigerating apparatuses, such as water heaters, refrigerator vehicles, and automotive air conditioners. The ejector cycle is constructed such that a compressor, a condenser, an ejector, and a gas-liquid separator are connected in series, and a gas outlet of the gas-liquid separator is connected to a suction port of the compressor, while a liquid outlet of the gas-liquid separator is connected to a suction port of the ejector via an evaporator.

The ejector comprises a nozzle having an ejection hole formed in a forward end thereof, a hollow cylindrical mixing portion extending from the outer periphery of the nozzle to the downstream side of the ejection hole, and a diffuser formed such that it is expanded as it extends from the mixing portion. The nozzle decompresses or reduces the pressure of high-temperature, high-pressure liquid refrigerant condensed by the condenser to a pressure not higher than an evaporation pressure, ejects the refrigerant from the forward end thereof as a low-pressure jet stream, and draws gaseous refrigerant from the evaporator by a differential pressure generated by the decompression or reduction of the pressure. In the mixing portion, the gaseous refrigerant drawn from the evaporator and the jet stream ejected from the nozzle are mixed with each other, and in the diffuser, the mixed refrigerant is reduced in flow speed due to an increase in area to have its pressure raised. Due to the rise in the pressure of the refrigerant by the ejector, the suction pressure of the compressor is increased, which makes it possible to reduce a power required for the compressor to compress the refrigerant to a predetermined pressure.

A stable flow of refrigerant is required by the ejector cycle during operation thereof, so that in water heaters, refrigerator vehicles, and automotive air conditioners, a compressor for compressing refrigerant is driven by an electric motor (see e.g. Japanese Unexamined Patent Publication (Kokai) No. 2002-22295 (Paragraph No. [0021])), or a sub-engine provided separately from an engine for driving an automotive vehicle (see e.g. Japanese Unexamined Patent Publication (Kokai) No. 2000-283577 (Paragraph No. [0014])), and the refrigerating power of the ejector cycle is controlled through control of the rotational speed of the electric motor or the sub-engine.

Particularly when the ejector cycle is applied to a refrigeration cycle for an automotive air conditioner, if the engine for driving an automotive vehicle is used as the drive source of the compressor, the rotational speed of the engine is largely dependent on operating conditions of the vehicle, causing fluctuation of the capacity of the compressor, which makes it difficult to control the ejector cycle. Therefore, another drive source, such as an electric motor or a sub-engine, for driving the compressor is required. Further, the ejector cycle has a large number of control valves and complicated piping, which increases the cost of the automotive air conditioner.

SUMMARY OF THE INVENTION

The present invention has been made in view of the above described points, and an object thereof is to provide a refrigeration cycle for an automotive air conditioner reduced in the cost thereof.

To solve the above problem, the present invention provides a refrigeration cycle comprising an ejector that draws evaporated refrigerant while decompressing cooled or condensed refrigerant, wherein a compressor for compressing the refrigerant is a variable displacement compressor.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to the drawings.

Figure 1:
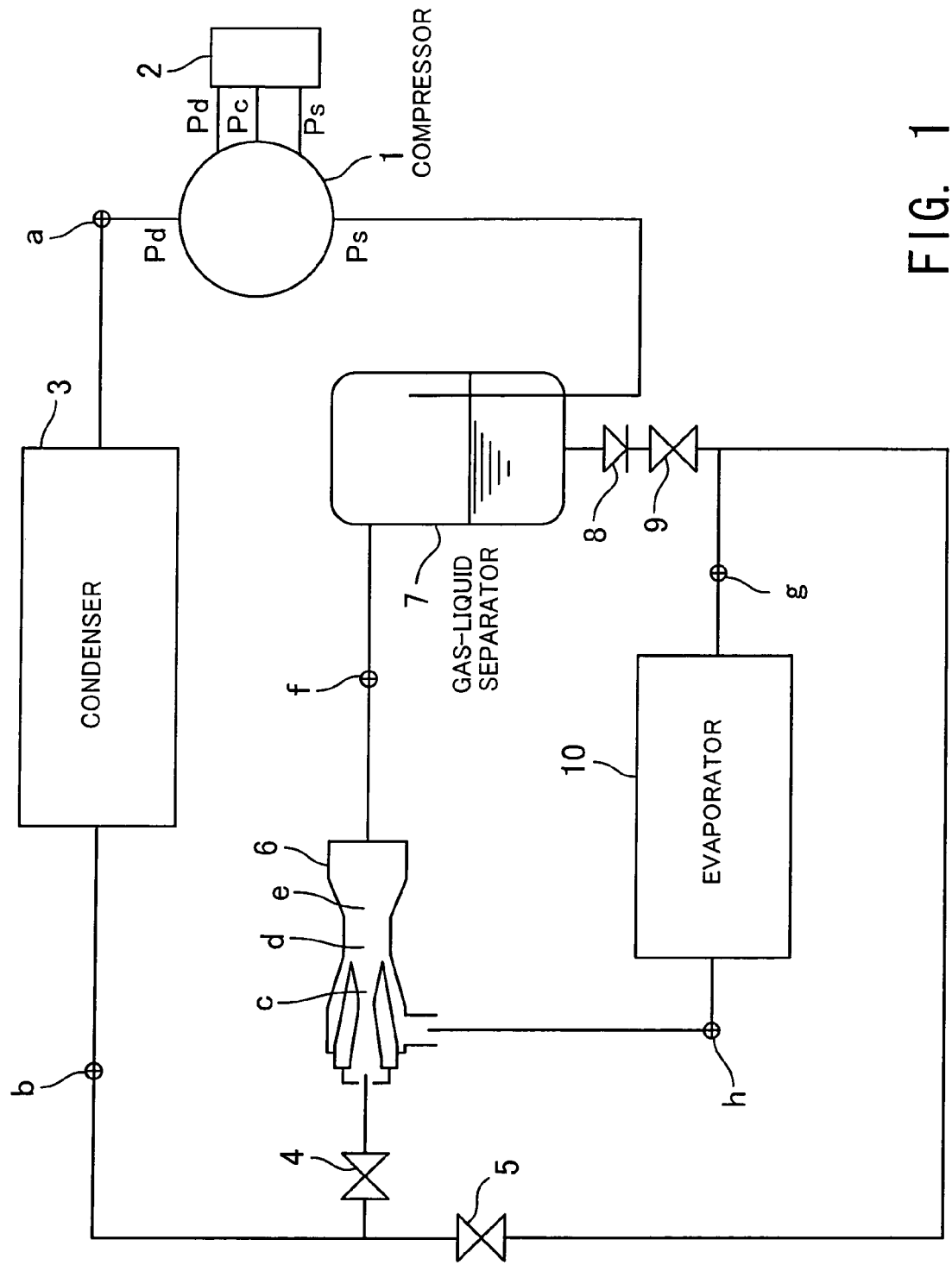
FIG. 1 is a system diagram showing a refrigeration cycle according to the present invention.
Figure 2:
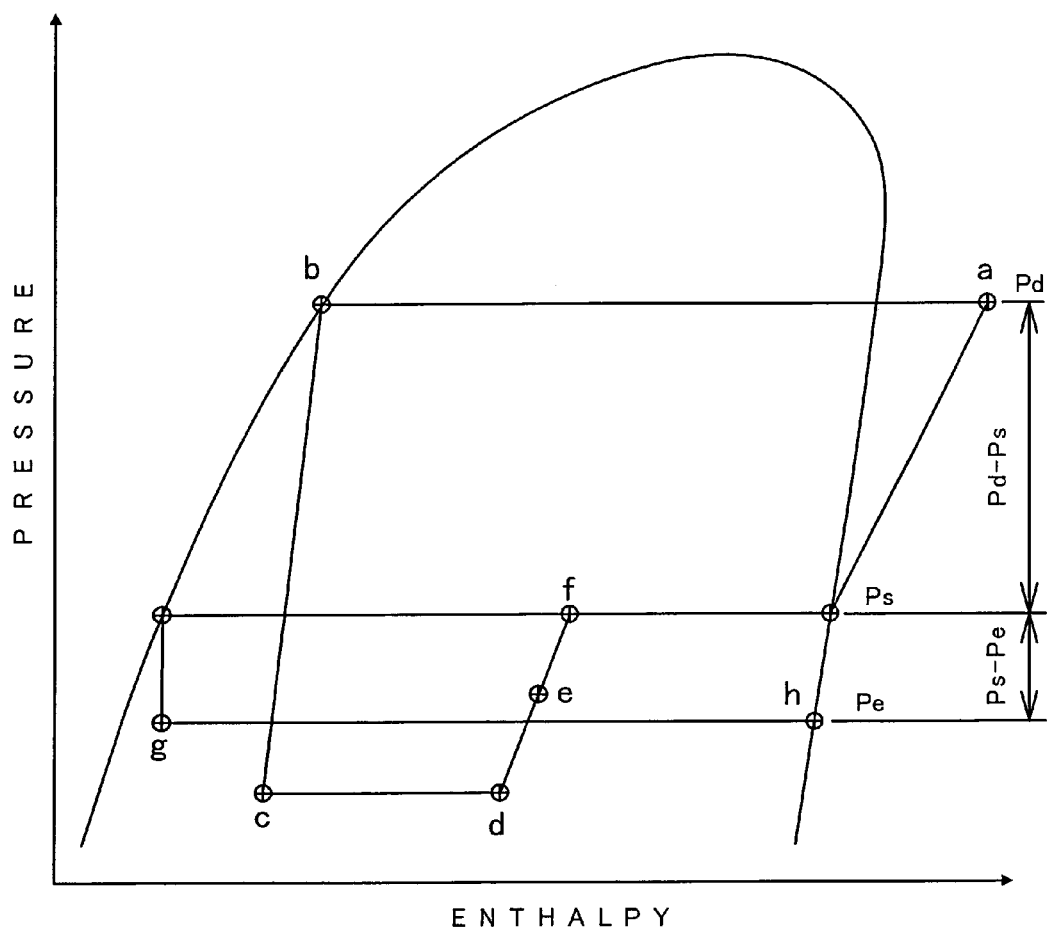
FIG. 2 is a Mollier chart which is useful in explaining the operation of the refrigeration cycle.
Figure 3:
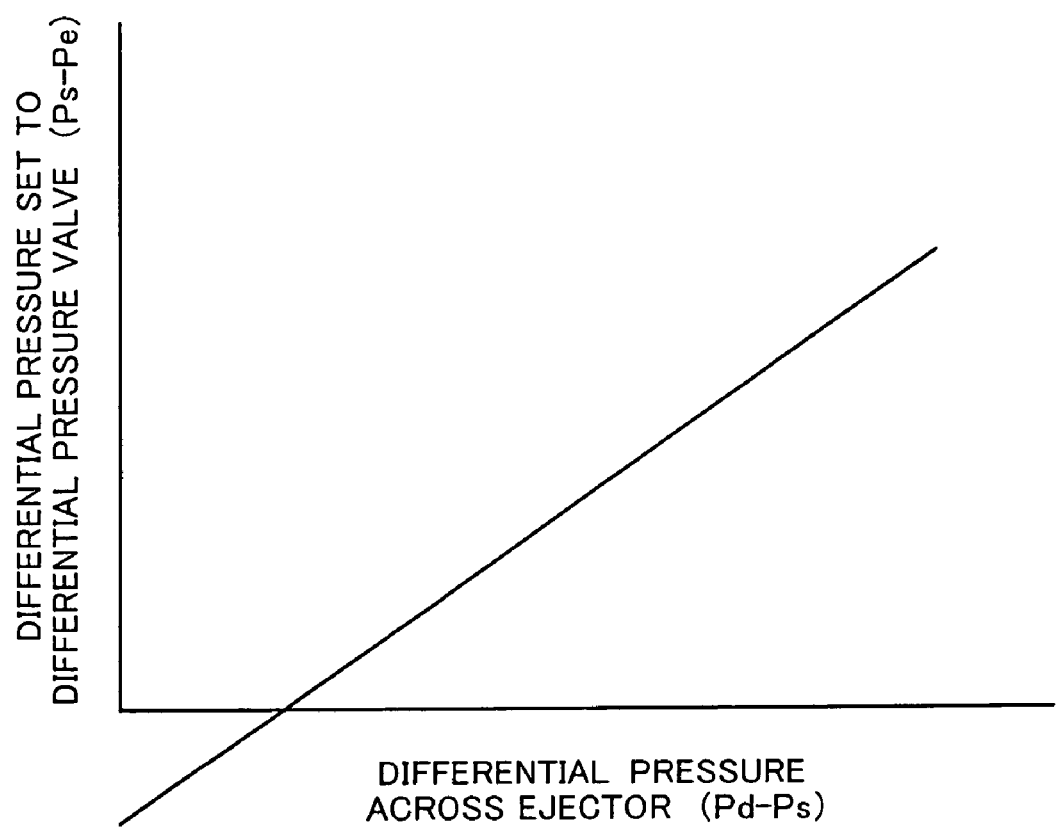
FIG. 3 is a diagram showing characteristics of a differential pressure valve.

FIG. 1 is a system diagram showing a refrigeration cycle according to the present invention. FIG. 2 shows a Mollier chart which is useful in explaining the operation of the refrigeration cycle. FIG. 3 is a diagram showing characteristics of a differential pressure valve.

The refrigeration cycle according to the present invention includes a compressor 1 using an engine for driving an automotive vehicle, as a drive source. The compressor 1 is a swash plate variable displacement compressor which is capable of controlling the discharging capacity of the refrigerant to be constant, irrespective of the rotational speed of the engine. The compressor 1 incorporates an electronically controllable solenoid-driven capacity control valve 2 to thereby control the discharging capacity thereof. The capacity control valve 2 is of a so-called differential pressure control type, which performs capacity control such that the differential pressure between the discharge pressure Pd and suction pressure Ps of the compressor 1 is held at a predetermined pressure determined by an external signal supplied to the solenoid. Responsive to the discharge pressure Pd and suction pressure Ps of the compressor 1, the capacity control valve 2 controls the flow rate of refrigerant at the discharge pressure Pd which is discharged from the compressor 1 and supplied to a crankcase, thereby controlling the pressure Pc in the crankcase to a pressure corresponding to the discharging capacity of the compressor such that the discharging capacity of the refrigerant is held constant. As this kind of the capacity control valve 2, it is possible to use, for example, a solenoid control valve shown in FIG. 4 of Japanese Unexamined Patent Publication (Kokai) No. 2001-132650.

To a refrigerant discharge outlet of the compressor 1 is connected to a condenser 3 that condenses compressed high-temperature, high-pressure refrigerant by heat exchange with the outside air, and to the outlet side of the condenser 3, there are connected two switching valves 4 and 5 for switching the flow path of the condensed refrigerant. The switching valves 4 and 5 can be implemented by solenoid-driven electromagnetic valves that are electronically controllable, or an electromagnetic three-way valve having the function of the switching valves 4 and 5. Or, as described hereinafter, the switching valves 4 and 5 can be implemented by three-way valve that mechanically performs switching by making use of the differential pressure across an ejector 6. The switching valve 4 is connected to a refrigerant inlet of the ejector 6 that decompresses and expands refrigerant having flowed out from the condenser 3, and a refrigerant outlet of the ejector 6 is connected to a gas-liquid separator 7 that separates refrigerant having flowed out from the ejector 6 into gas and liquid. A gaseous refrigerant outlet of the gas-liquid separator 7 is connected to a refrigerant suction inlet of the compressor 1, while a liquid refrigerant outlet of the gas-liquid separator 7 is connected to a check valve 8. The check valve 8 is connected in series to a differential pressure valve 9 whose outlet is connected to an outlet of the switching valve 5 and a refrigerant inlet of an evaporator 10. The evaporator 10 evaporates liquid refrigerant by heat exchange with air to be blown into a vehicle compartment, thereby cooling the air. A refrigerant outlet of the evaporator 10 is connected to a suction inlet of the ejector 6.

The ejector 6 converts the pressure energy of high-pressure refrigerant having flowed out from the condenser 3 to speed energy by a nozzle thereof, thereby decompressing and expanding the refrigerant, draws gaseous refrigerant formed by evaporation in the evaporator 10 by negative pressure generated by a jet stream of refrigerant ejected from the nozzle, mixes the drawn gaseous refrigerant and the jet stream ejected from the nozzle with each other at a mixing portion thereof, and converts the speed energy of the mixed refrigerant to pressure energy by a diffuser to thereby increase the pressure of the refrigerant.

The differential pressure valve 9 can be implemented e.g. by an electronically controllable solenoid-driven control valve, and is assumed to have a characteristic that when the value of current supplied to the solenoid is equal to 0, the differential pressure valve 9 is held fully open to make the differential pressure between the pressure in an inlet thereof and the pressure in an outlet thereof approximately equal to 0, and as the current value increases, the refrigerant passage therethrough is narrowed to increase the differential pressure.

Next, the operation of the refrigeration cycle configured as above will be described with reference to FIG. 2 and FIG. 3. In the Mollier chart shown in FIG. 2 with the horizontal axis representing enthalpy and the vertical axis representing pressure, states of refrigerant at respective locations in a circuit of the refrigeration cycle, indicated by the symbols a to h, are indicated by the same symbols a to h. In FIG. 3, the horizontal axis represents the differential pressure across the ejector 6, and the vertical axis represents the differential pressure set to the differential pressure valve 9.

First, when an automotive air conditioner is started, the switching valves 4 and 5 are switched such that the switching valve 4 is fully open and the switching valve 5 is fully closed. When the compressor 1 is driven for rotation by the engine, the compressor 1 draws and compresses gaseous refrigerant from the gas-liquid separator 7, and discharges the compressed refrigerant to the condenser 3. At this time, the capacity of the compressor 1 is controlled by a capacity control valve 2 such that the differential pressure (Pd–Ps) between the discharge pressure Pd and the suction pressure Ps becomes equal to a predetermined differential pressure set by a control signal from a control system, not shown.

The refrigerant condensed by the condenser 3 enters the ejector 6 via the switching valve 4, and is decompressed and expanded at the nozzle of the ejector 6 so as to draw refrigerant from the evaporator 10. The sucked refrigerant is mixed with the refrigerant ejected from the nozzle. The dynamic pressure of the mixed refrigerant is converted to a static pressure by the diffuser, and the mixed refrigerant enters the gas-liquid separator 7. To the evaporator 10 from which refrigerant is drawn by the ejector 6, liquid refrigerant is caused to flow in from the gas-liquid separator 7 via the check valve 8 and the differential pressure valve 9. The liquid refrigerant exchanges heat with air to be blown into the vehicle compartment, and is evaporated by absorbing heat from the air.

At this time, the solenoid-driven differential pressure valve 9 is controlled by the control system, not shown, such that the differential pressure set thereto is changed in dependence on the power of the ejector 6 for drawing refrigerant from the evaporator 10. The power of drawing refrigerant depends on the differential pressure between the pressure in a refrigerant inlet of the nozzle of the ejector 6 and the pressure in the outlet of the ejector 6. The pressure (point b) in the refrigerant inlet of the ejector 6 is approximately equal to the discharge pressure Pd of the compressor 1, if pressure losses in the condenser 3 and the piping are ignored. Further, a pressure (point f) in the outlet of the ejector 6 is approximately equal to the suction pressure Ps of the compressor 1. Therefore, it can be said that the differential pressure across the ejector 6 is approximately equal to the differential pressure (Pd–Ps) between the discharge pressure Pd and the suction pressure Ps of the compressor 1. The differential pressure (Pd–Ps) is also a target value of control of the capacity control valve 2 that controls the capacity of the compressor 1, and therefore the control system, not shown, accurately recognizes the differential pressure (Pd–Ps) across the compressor 1 from the control signal delivered to the capacity control valve 2, and hence is capable of estimating the differential pressure across the ejector 6 based on the differential pressure (Pd–Ps). In short, the control system is capable of directly estimating the power of the ejector 6 for drawing refrigerant from the evaporator 10, and therefore, as shown in FIG. 3, controls the differential pressure valve 9 such that it is set to a differential pressure approximately proportional to the differential pressure across the ejector 6. As a result, assuming that the pressure in a refrigerant passage from the refrigerant outlet (point f) of the ejector 6 to the refrigerant inlet of the compressor 1 is approximately equal to the suction pressure Ps, and evaporation pressure within the evaporator 10 (point g to point h) is represented by a pressure Pe, the differential pressure valve 9 is set to the differential pressure (Ps–Pe). Therefore, as the differential pressure across the ejector 6 increases, the differential pressure valve 9 is set to a larger differential pressure, whereby the refrigerant flowing from the gas-liquid separator 7 to the evaporator 10 is decompressed and expanded by the differential pressure valve 9 to an extent corresponding to the differential pressure set to the differential pressure valve 9. This causes the refrigerant in a lower temperature condition to enter the evaporator 10 which increases the refrigerating power of the refrigeration cycle.

Inversely, to lower the refrigerating power of the refrigeration cycle, the capacity of the compressor 1 is controlled by the capacity control valve 2 such that the differential pressure across the compressor 1 is decreased. This also decreases the differential pressure across the ejector 6, and therefore the power of the ejector 6 for drawing refrigerant from the evaporator 10 is also decreased. As a result, the amount of refrigerant drawn from the evaporator 10 into the ejector 6 becomes smaller, so that refrigerant supplied from the gas-liquid separator 7 is not fully evaporated, but part thereof is left unevaporated in the evaporator 10 to stay therein as liquid refrigerant. When the refrigeration cycle continues to be operated in such a state, the flow rate of the refrigerant flowing through the compressor 1 is reduced, whereby lubricant oil for the compressor 1, contained the refrigerant, becomes short. This can cause seizure of the compressor 1.

To solve the above problem, the control system controls the switching valves 4 and 5 such that when the differential pressure set to the capacity control valve 2 has been made lower than a predetermined value, i.e. when the differential pressure across the ejector 6 has become smaller than 0.3 MPa, the switching valve 4 and the switching valve 5 are switched to a fully-closed state and a fully-open state, respectively, to thereby cause refrigerant having flowed out from the condenser 3 to forcibly flow into the evaporator 10. As a result, refrigerant discharged from the compressor 1 is caused to flow along a loop returning to the compressor 1 via the condenser 3, the switching valve 5, the evaporator 10, the ejector 6, and the gas-liquid separator 7, which prevents the compressor 1 from becoming short of lubricant oil, and further causes the liquid refrigerant remaining in the evaporator 10 as well to be forcibly circulated together. At this time, when the refrigerant flows from the switching valve 5 to the evaporator 10, the check valve 8 is closed by the pressure of the flowing refrigerant, which makes it impossible for the refrigerant to bypass the evaporator 10 and the ejector 6 and flow into the gas-liquid separator 7.

Figure 4:
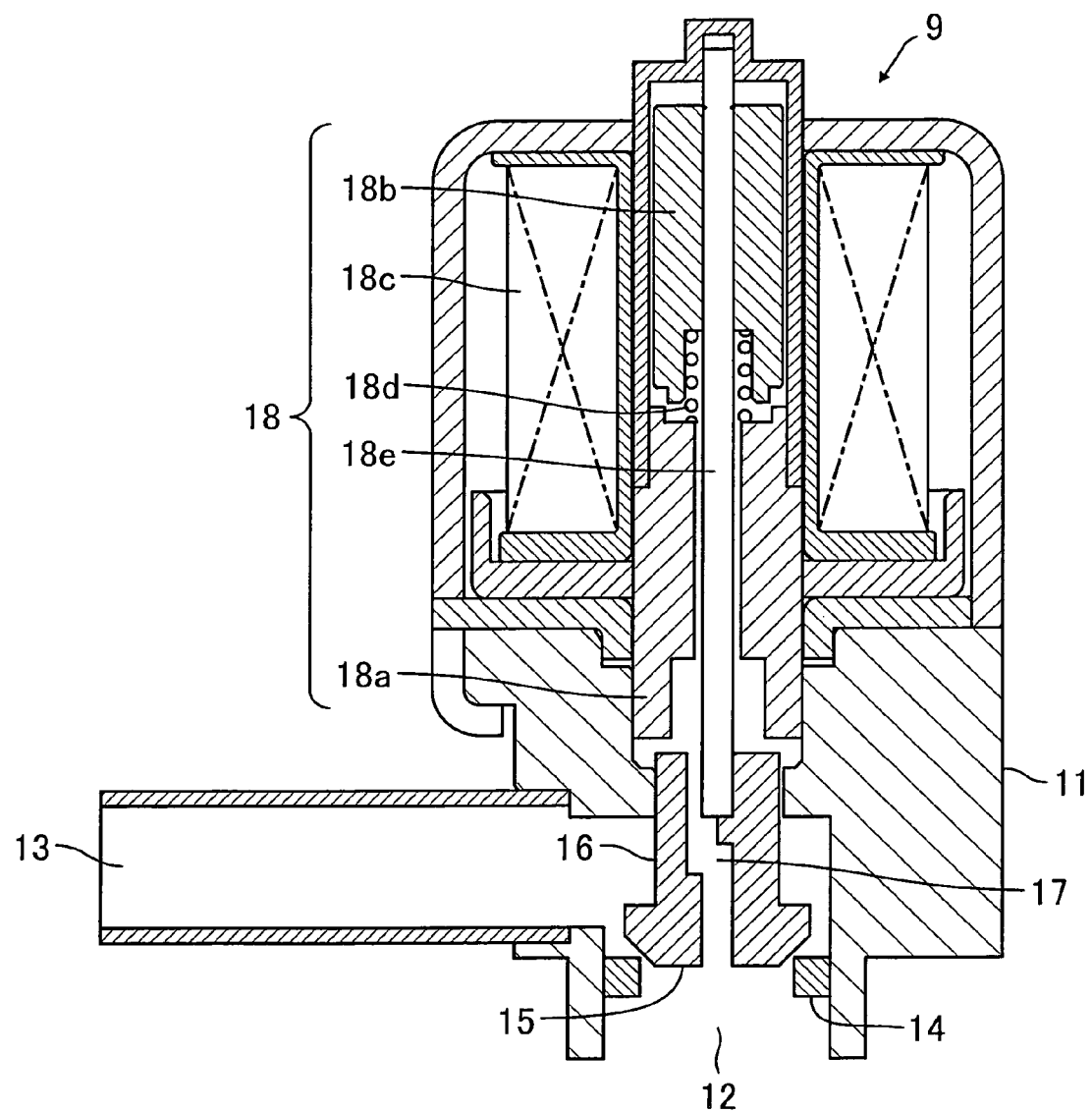
FIG. 4 is a longitudinal cross-sectional view showing an example of the construction of a solenoid-driven differential pressure valve.

FIG. 4 is a longitudinal cross-sectional view showing an example of the construction of the solenoid-driven differential pressure valve.

The differential pressure valve 9 has body 11 formed with a refrigerant inlet 12 connected to the liquid refrigerant outlet of the gas-liquid separator 7, and a refrigerant outlet 13 connected to the evaporator 10. The refrigerant inlet 12 has a valve seat 14 fitted therein. A valve element 15 is disposed in a manner opposed to the valve seat 14 on the downstream side, such that the valve element 15 can move to and away from the valve seat 14. The valve element 15 is integrally formed with a piston 16 having a diameter smaller than the inner diameter of the valve seat 14. A passage 17 is formed through the valve element 15 and the piston 16 in the direction of the axis thereof, such that the pressure received from the gas-liquid separator 7 by the valve element 15 is also received by the piston 16 from the opposite direction.

Provided on an upper portion, as viewed in the FIG. 4, of the body 11 is a solenoid 18. The solenoid 18 comprises a core 18a, a plunger 18b, a coil 18c, a spring 18d, and a shaft 18e. The core 18a is rigidly fixed to the body 11. The plunger 18b is urged by the spring 18d in a direction away from the core 18a, and at the same time fixed to one end of the shaft 18e extending through the core 18a. The shaft 18e also has the piston 16 fitted on the other end thereof.

Therefore, when the value of current supplied to the coil 18c of the solenoid 18 is equal to 0, the plunger 18b urged by the spring 18d in the direction away from the core 18a pulls the shaft 18e upward, as viewed in FIG. 4, whereby the valve element 15 is moved in a direction away from the valve seat 14, to hold the differential pressure valve 9 in the fully-open state.

When current is supplied to the coil 18c, the plunger 18b is attracted to the core 18a against the urging force of the spring 18d, whereby the shaft 18e fixed to the plunger 18b pushes the piston 16 downward. This causes the valve element 15 integrally formed with the piston 16 to move toward the valve seat 14, to narrow a refrigerant passage formed between the refrigerant inlet 12 and the refrigerant outlet 13, thereby creating a differential pressure across the differential pressure valve 9. The differential pressure is set according to the value of current supplied to the coil 18c. The current value is controlled to a value corresponding to a differential pressure approximately proportional to the differential pressure across the ejector 6 estimated from the control signal delivered to the capacity control valve 2 of the compressor 1.

It should be noted that by maximizing the value of the current supplied to the coil 18c, it is possible to cause the valve element 15 to be seated on the valve seat 14. Therefore, when the differential pressure across the ejector 6 becomes lower than the predetermined value, the refrigerant passage between the refrigerant inlet 12 and the refrigerant outlet 13 can be fully closed by maximizing the value of the current supplied to the coil 18*c*, which makes it possible to cause the differential pressure valve 9 to function as the check valve 8.

Although in the above embodiment, the differential pressure valve 9, and the switching valves 4 and 5 have been described as valves electronically controlled by the control system, not shown, together with the capacity control valve 2, in the following, an example of the construction of a valve mechanically controlled by pressure of refrigerant will be described. First, a description will be given of a control valve which has a check valve 8 and a differential pressure valve 9 integrally formed with each other.

Figure 5:
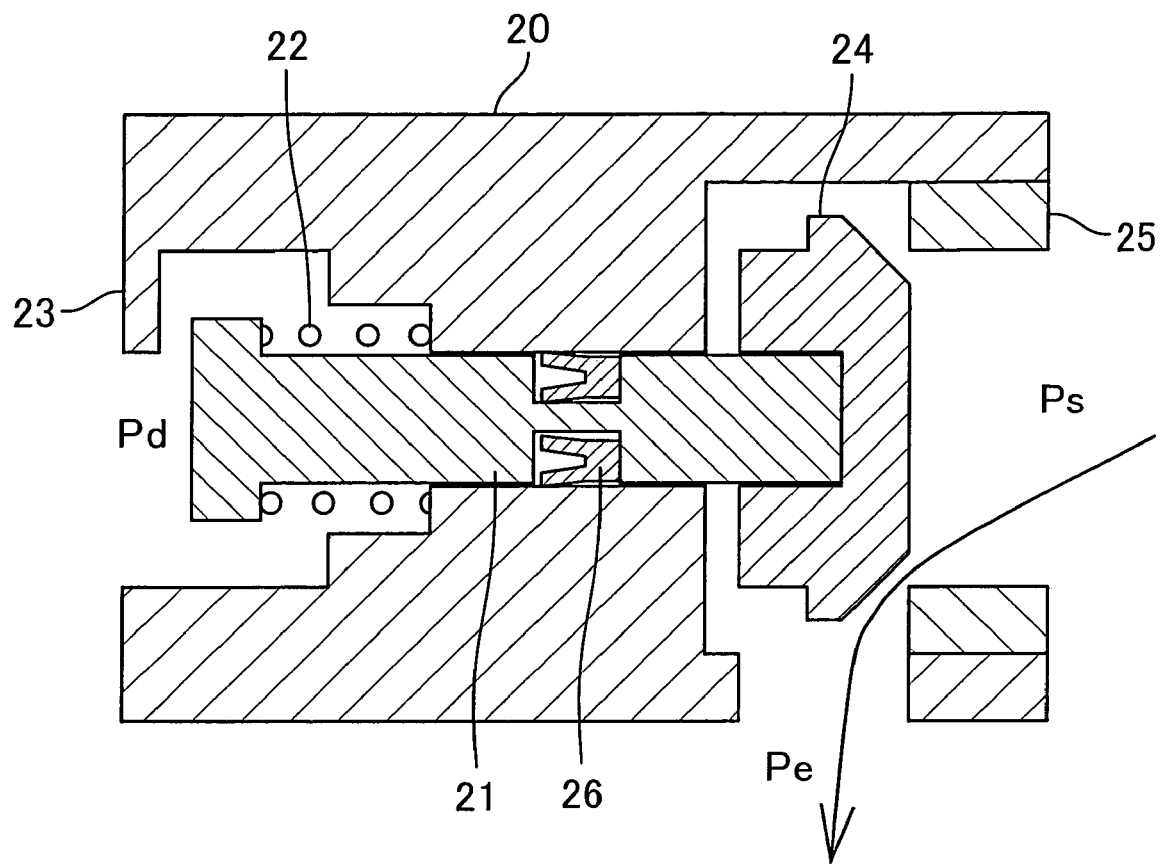
FIG. 5 is a cross-sectional view showing an example of the construction of a first control valve in a state during normal operation.
Figure 6:
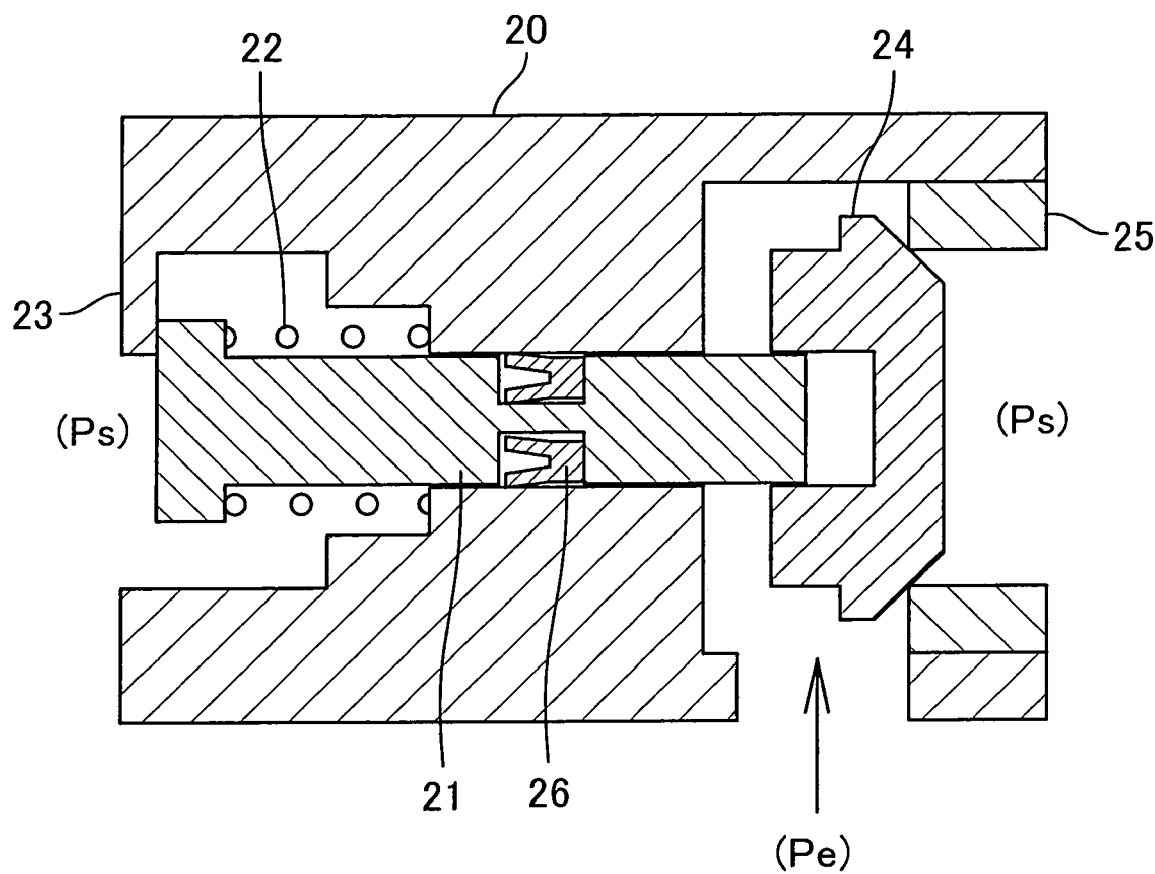
FIG. 6 is a cross-sectional view showing the example of the construction of the first control valve in a state during forcibly circulating operation.

FIG. 5 is a cross-sectional view showing an example of the construction of a first control valve in a state during normal operation. FIG. 6 is a cross-sectional view showing the example of the construction of the first control valve in a state during forcibly circulating operation.

The control valve includes a piston 21 slidably disposed within a body 20 such that it extends therethrough. The piston 21 is urged by a spring 22 in the direction of being brought into abutment with a stopper 23 formed in the body 20. A space accommodating the spring 22 communicates with piping connected to the refrigerant inlet of the ejector 6. Therefore, during normal operation in which the differential pressure across the ejector 6 is not lower than the predetermined value, pressure substantially equal to the discharge pressure Pd of the compressor 1 is introduced, and hence the introduced pressure is represented here by the discharge pressure Pd. The piston 21 has a valve element 24 loosely fitted thereon in an axially movable manner, on a side thereof opposite to the side where the spring 22 is disposed. A space accommodating the valve element 24 communicates with piping connected to the evaporator 10, so that the pressure within this space is substantially equal to the pressure Pe within the evaporator 10. Therefore, the pressure in this space is represented here by the pressure Pe. Disposed at a location opposed to the valve element 24 is a valve seat-forming member 25 fitted in an opening of the body 20. A valve hole of the valve seat-forming member 25 is connected to the liquid refrigerant outlet of the gas-liquid separator 7 in which the pressure is substantially equal to the suction pressure Ps of the compressor 1. Around the piston 21, there is provided a V packing 26, as required, for preventing internal leakage of refrigerant from the refrigerant inlet of the ejector 6 to the evaporator 10.

As shown in FIG. 5, during normal operation in which the differential pressure across the ejector 6 is not lower than the predetermined value, the piston 21 receives the discharge pressure Pd at one end thereof, and the pressure Pe from the evaporator 10 at the other end thereof, while the valve element 24 receives the pressure Pe from the evaporator 10 at one side thereof and the suction pressure Ps at the other side thereof. Therefore, in the control valve, the differential pressure between the discharge pressure Pd and the suction pressure Ps, i.e. the differential pressure (Pd−Ps) across the ejector 6 determines the axial position of the piston 21 and the lift amount of the valve element 24 which is pressed against the piston 21 by the suction pressure Ps higher than the pressure Pe from the evaporator 10, whereby the differential pressure (Ps−Pe) of the refrigerant flowing from the gas-liquid separator 7 to the evaporator 10 is set.

As the differential pressure (Pd−Ps) across the ejector 6 increases, the lift amount of the valve element 24 decreases and the differential pressure (Ps−Pe) increases, in a manner substantially proportional to the increase in the differential pressure (Pd−Ps). Inversely, as the differential pressure (Pd−Ps) across the ejector 6 decreases, the lift amount of the valve element 24 increases and the differential pressure (Ps−Pe) decreases, in a manner substantially proportional to the decrease in the differential pressure (Pd−Ps). Therefore, at this time, the valve element 24 serves as the differential pressure valve 9 in the FIG. 1 system in which the differential pressure (Ps−Pe) is controlled substantially proportionally to the differential pressure (Pd−Ps) across the ejector 6, as shown in FIG. 3.

As shown in FIG. 6, during forcibly circulating operation in which the differential pressure across the ejector 6 is lower than the predetermined value, the switching valve 4 connected to the refrigerant inlet of the injector 6 is in its fully-closed state, and refrigerant having flowed out from the condenser 3 is introduced into the evaporator 10 via the switching valve 5, so that the piston 21 receives pressure close to the suction pressure Ps at the one end thereof, and pressure reduced by the switching valve 5 which is close to the pressure Pe of the evaporator 10, at the other end thereof. At this time, the pressure Pe from the evaporator 10 is larger than the suction pressure Ps, so that in the control valve, the piston 21 is brought into abutment with the stopper 23 by the differential pressure between the suction pressure Ps and the pressure Pe from the evaporator 10, and the urging force of the spring 22, while the valve element 24 is guided by the piston 21 to be seated on the valve seat-forming member 25. As a result, the liquid refrigerant outlet of the gas-liquid separator 7 is closed. In short, at this time, the valve element 24 serves as the check valve 8 in the FIG. 1 system.

Figure 7:
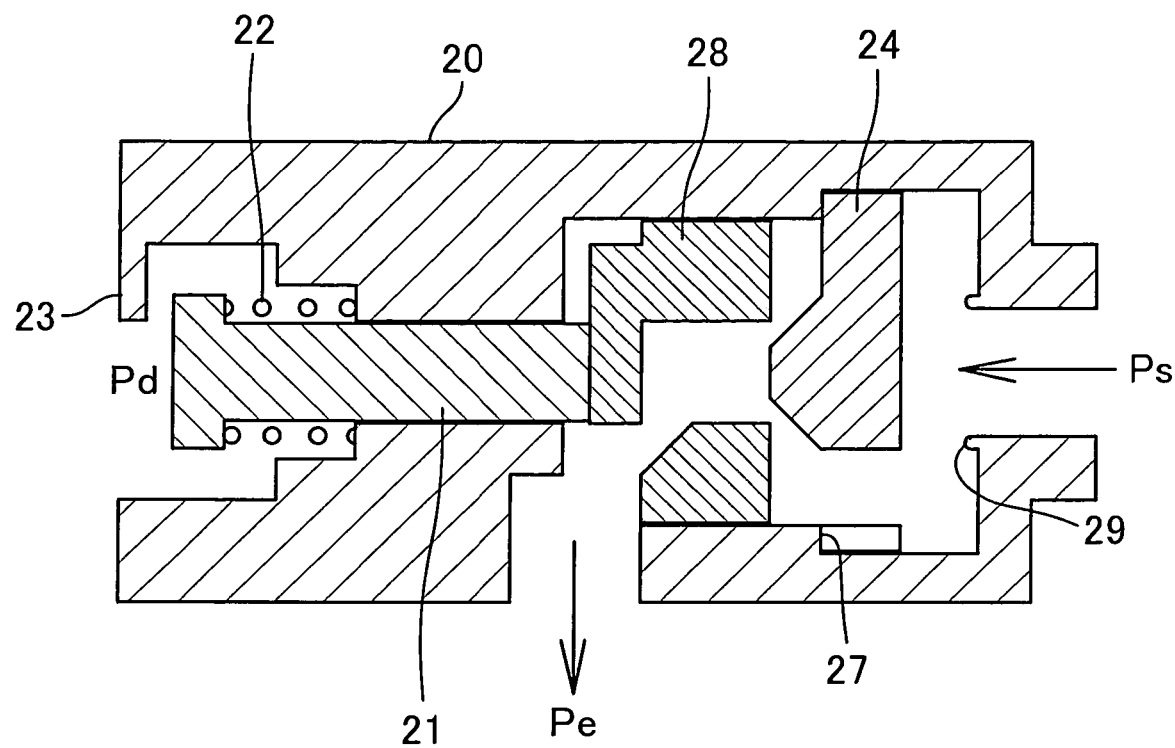
FIG. 7 is a cross-sectional view showing an example of the construction of a second control valve in a state during normal operation.
Figure 8:
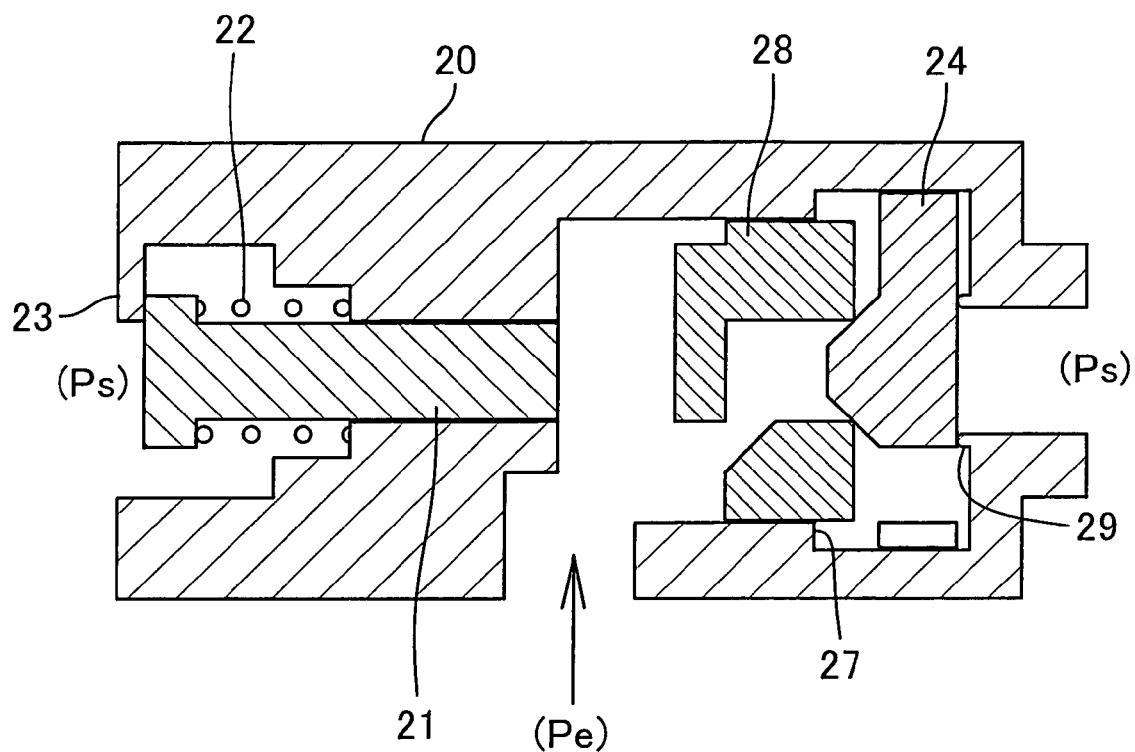
FIG. 8 is a cross-sectional view showing the example of the construction of the second control valve in a state during forcibly circulating operation.

FIG. 7 is a cross-sectional view showing an example of the construction of a second control valve in a state during normal operation. FIG. 8 is a cross-sectional view showing the example of the construction of the second control valve in a state during forcibly circulating operation. It should be noted that in FIGS. 7 and 8, component elements having functions identical to or equivalent to those of the components shown in FIG. 5 and FIG. 6 are designated by identical reference numerals.

The control valve includes a piston 21 slidably disposed within a body 20 such that it extends through the body 20. The piston 21 is urged by a spring 22 in the direction of being brought into abutment with a stopper 23 formed in the body 20. A space accommodating the spring 22 communicates with the refrigerant inlet of the ejector 6 to introduce therein pressure substantially equal to the discharge pressure Pd of the compressor 1. The body 20 has an opening formed therein on a side opposite to the side where the stopper 23 is formed, which communicates with the liquid refrigerant outlet of the gas-liquid separator 7 to receive pressure substantially equal to the suction pressure Ps of the compressor 1, and a hole formed in a substantially central portion thereof, which communicates with the evaporator 10 to make pressure in the hole substantially equal to the pressure Pe within the evaporator 10. Between the opening and the hole are coaxially formed two cylinders having different diameters. The cylinder formed on a side where the piston 21 protrudes, has a smaller diameter to form a stepped portion 27 at a boundary between the two cylinders. The large-diameter cylinder has a valve element 24 axially and movably disposed therein, while the small-diameter cylinder has a movable valve seat 28 axially and movably disposed therein, which cooperates with the valve element 24 to form the differential pressure valve 9 in the FIG. 1 system. The movable valve seat 28 has a valve hole communicating with a plurality of passages formed in the valve seat 28 such that they open at locations shifted from a location where the movable valve seat 28 is brought into abutment with the piston 21. On the other hand, the valve element 24 has a plurality of through holes axially extending through the cylinder, which are formed in a circumferential arrangement at locations close to a sliding surface via which the valve element 24 slides on the cylinder. Further, the body 20 has an annular valve seat 29 formed on the opening communicating with the gas-liquid separator 7, in a manner opposed to the valve element 24. The annular valve seat 29 cooperates with the valve element 24 to form the check valve 8 in the FIG. 1 system.

As shown in FIG. 7, during normal operation in which the differential pressure across the ejector 6 is not lower than the predetermined value, the piston 21 receives the discharge pressure Pd at one end thereof and the pressure Pe from the evaporator 10 at the other end thereof, and has the movable valve seat 28 brought into abutment therewith. At this time, the valve element 24 is pushed by the suction pressure Ps from the gas-liquid separator 7 to be brought into abutment with the stepped portion 27. Therefore, in the control valve, the differential pressure (Pd−Ps) across the ejector 6 determines the axial position of the piston 21, and the lift amount of the valve element 24, which corresponds to a separation distance between the valve element 24 remaining unmoved and the movable valve seat 28, whereby the differential pressure (Ps−Pe) of the liquid refrigerant flowing from the gas-liquid separator 7 to the evaporator 10 is set.

As the differential pressure (Pd−Ps) across the ejector 6 increases, the lift amount of the valve element 24 decreases, and the differential pressure (Ps−Pe) increases, in a manner substantially proportional to the increase in the differential pressure (Pd−Ps). Inversely, when the differential pressure (Pd−Ps) across the ejector 6 decreases, the lift amount of the valve element 24 increases, and the differential pressure (Ps−Pe) decreases, in a manner substantially proportional to the decrease in the differential pressure (Pd−Ps). Therefore, at this time, the valve element 24 is controlled such that the differential pressure (Ps−Pe) thereacross is controlled substantially proportionally to the differential pressure (Pd−Ps) across the ejector 6, as shown in FIG. 3.

As shown in FIG. 8, during forcibly circulating operation in which the differential pressure across the ejector 6 is lower than the predetermined value, the piston 21 receives pressure close to the suction pressure Ps at one side thereof, and pressure reduced by the switching valve 5 which is close to the pressure Pe within the evaporator 10, at the other side thereof, so that the piston 21 is brought into abutment with the stopper 23 by the differential pressure between the suction pressure Ps and the pressure Pe, and the urging force of the spring 22. On the other hand, the valve element 24 is seated on the movable valve seat 28 due to movement of the movable valve seat 28 pushed by the pressure close to the pressure Pe within the evaporator 10, and at the same time also seated on the valve seat 29 by being pushed by the pressure close to the pressure Pe within the evaporator 10. As a result, the control valve closes the liquid refrigerant outlet of the gas-liquid separator 7.

Figure 9:
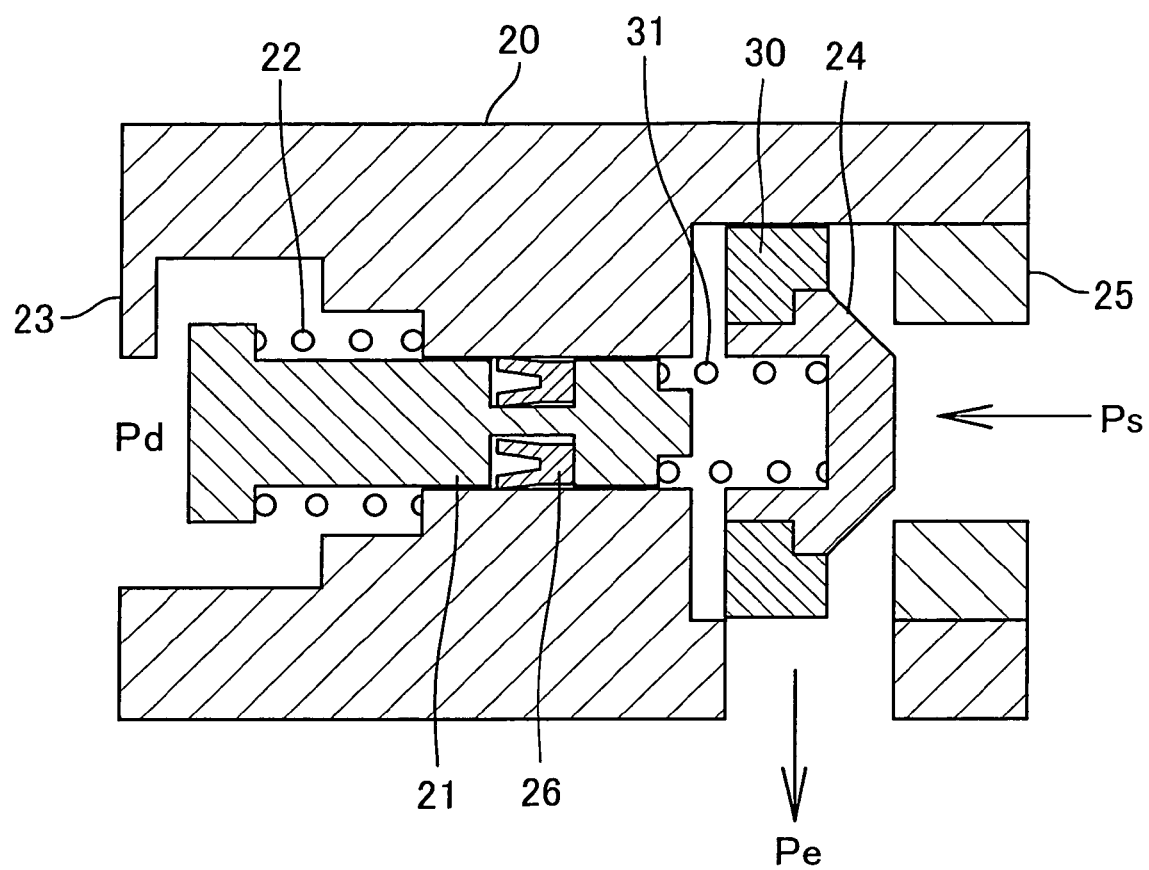
FIG. 9 is a cross-sectional view showing an example of the construction of a third control valve in a state during normal operation.

FIG. 9 is a cross-sectional view showing an example of the construction of a third control valve in a state during normal operation. It should be noted that in FIG. 9, component elements having functions identical to or equivalent to those of the component elements shown in FIG. 5 are designated by identical reference numerals.

The third control valve is distinguished from the first control valve which has the valve element 24 guided by the piston 21, in that it includes a guide 30 for holding the valve element 24 in a manner movable in an axial direction of the piston 21, and at the same time a spring 31 is disposed between the piston 21 and the valve element 24, and further in that a difference between a pressure-receiving area of the valve element 24 and a pressure-receiving area of the piston 21 receiving high pressure is made smaller.

More specifically, the third control valve is configured such that an effective pressure-receiving area of the valve element 24 is made smaller than that of the valve element 24 required for balancing pressure (Pd) received from the ejector 6 and pressure (Ps) received from the gas-liquid separator 7, and shortage of the pressure (Ps) to be received from the gas-liquid separator 7 is compensated for by the spring 31. This makes it possible to reduce the size of the valve element 24, thereby making it possible to improve seating performance of the valve element 24 on the valve seat-forming member 25.

Next, a description will be given of a device making it possible to mechanically operate the switching valves 4 and 5 by the differential pressure across the ejector 6.

Figure 10:
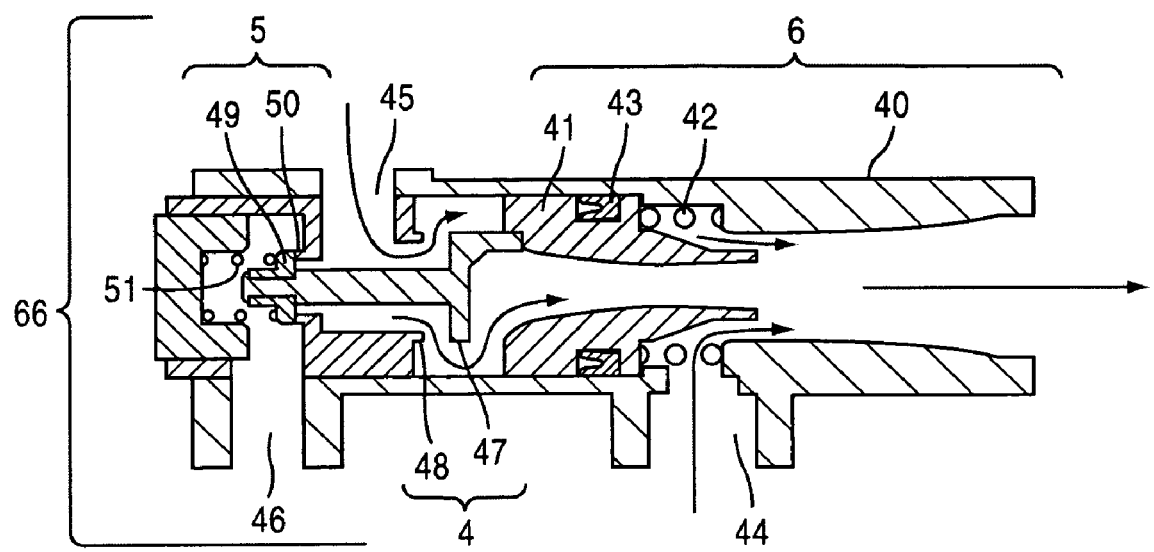
FIG. 10 is a cross-sectional view showing an example of the construction of a device comprised of switching valves and an ejector integrally formed with each other, in a state during normal operation.
Figure 11:
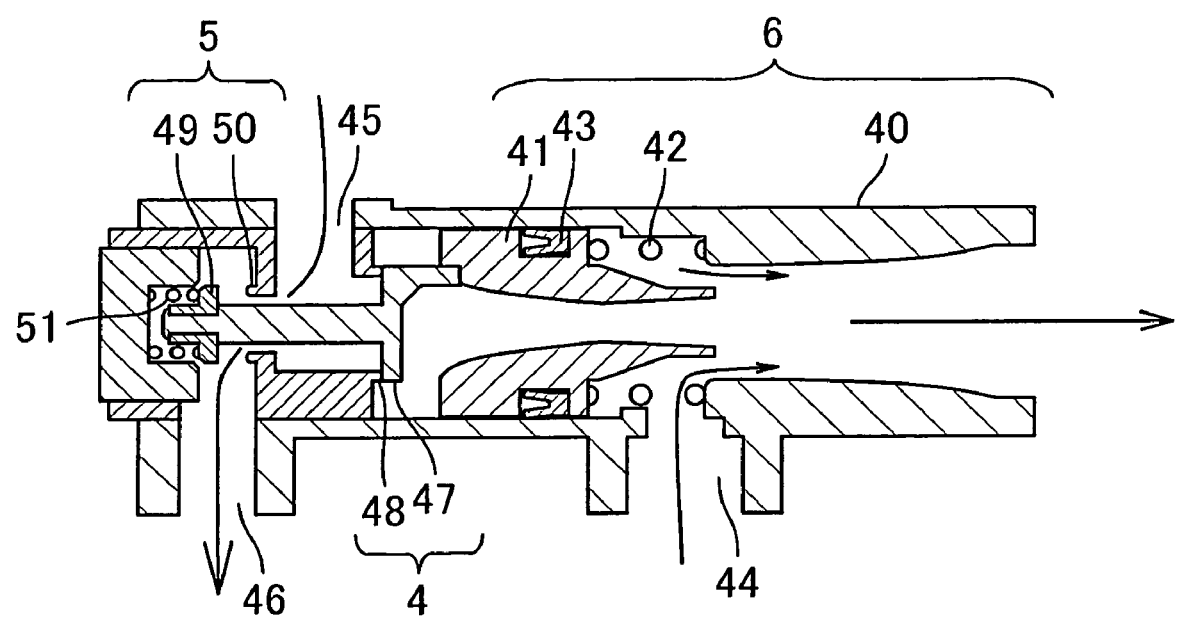
FIG. 11 is a cross-sectional view showing an example of the construction of the device comprised of the switching valves and the ejector integrally formed with each other, in a state during forcibly circulating operation.

FIG. 10 is a cross-sectional view showing an example of the construction of the device comprised of switching valves and an ejector integrally formed with each other, in a state during normal operation. FIG. 11 is a cross-sectional view showing an example of the construction of the device comprised of the switching valves and the ejector integrally formed with each other, in a state during forcibly circulating operation.

The ejector 6 comprises a body 40 having the interior of a refrigerant outlet side configured in the form of a diffuser, a nozzle 41 disposed within the body 40 in a manner movable in an axial direction thereof, and a spring 42 urging the nozzle 41 toward a refrigerant inlet side. Around the nozzle 41 is disposed a V packing 43 for preventing internal leakage of refrigerant from the refrigerant inlet of the injector 6 to a mixing portion thereof. The body 40 includes a refrigerant inlet 44 for introducing gaseous refrigerant evaporated by the evaporator 10 into an outer periphery of the nozzle 41 inward of a forward end thereof by suction, a refrigerant inlet 45 for introducing liquid refrigerant having flowed out from the condenser 3, and a refrigerant outlet 46 for causing the liquid refrigerant introduced into the refrigerant inlet 45 during forcibly circulating operation, to flow to the evaporator 10.

Between the refrigerant inlet 45 and the nozzle 41, there are arranged a valve element 47 having a large pressure-receiving area, and a valve seat 48, which form the switching valve 4 in FIG. 1. The valve element 47 is connected to the nozzle 41 e.g. by three leg portions integrally formed therewith. Further, between the refrigerant inlet 45 and the refrigerant outlet 46, there are arranged a valve element 49 having a small pressure-receiving area, and a valve seat 50, which form the switching valve 5 in FIG. 1. The valve element 47 and the valve element 49 are connected to each other by a shaft extending through respective associated valve holes. The valve element 47, the valve element 49, and the nozzle 41 are urged by a spring 51 toward the refrigerant outlet of the ejector 6. Therefore, when one of the switching valves 4 and 5 is open, the other of them is closed, thus the switching valves 4 and 5 forming a three-way valve 66. As described above, the switching valves 4 and 5 are configured to be capable of being mechanically switched, which makes it possible to form the control valve at a reduced cost.

As shown in FIG. 10, during normal operation in which the differential pressure across the ejector 6 is not lower than a predetermined value, high-pressure liquid refrigerant introduced from the condenser 3 into the refrigerant inlet 45 pushes open the switching valve 4 having a larger pressure-receiving area. This causes refrigerant to be introduced into a space between the switching valve 4 and the nozzle 41, which in turn causes the nozzle 41 having a still larger pressure-receiving area to be moved against the urging force of the spring 42 until it is brought into abutment with a stopper formed by a stepped portion. When the switching valve 5 is closed according to the movement of the nozzle 41, all the liquid refrigerant introduced into the refrigerant inlet 45 flows through the nozzle 41. At this time, gaseous refrigerant evaporated by the evaporator 10 is drawn from the refrigerant inlet 44, mixed with a jet stream from the nozzle 41, reduced in flow speed by the diffuser to be raised in pressure, and caused to flow out from the refrigerant outlet of the ejector 6 to the gas-liquid separator 7.

As shown in FIG. 11, during forcibly circulating operation in which the differential pressure across the ejector 6 is lower than the predetermined value, the urging force of the spring 42 on the side of the nozzle 41 overcomes the pressure of the liquid refrigerant introduced into the refrigerant inlet 45 to thereby push the nozzle 41 toward the switching valve 4. This causes the valve element 49 moving in unison with the nozzle 41 to move away from the valve seat 50 to open the switching valve 5, and at the same time causes the valve element 47 to be seated on the valve seat 48 to close the switching valve 4. As a result, the liquid refrigerant introduced into the refrigerant inlet 45 from the condenser 3 is caused to flow to the evaporator 10 via the switching valve 5.

It should be noted that the above three-way valve structure may be configured to perform switching by a snap action which takes a short switching time, or alternatively by a slow switching action which takes a long switching time, causing the switching valves 4 and 5 to open simultaneously.

Next, a description will be given of an example of the construction of a device in which the switching valves 4 and 5, the ejector 6, the check valve 8, and the differential pressure valve 9 are integrally formed with each other.

Figure 12:
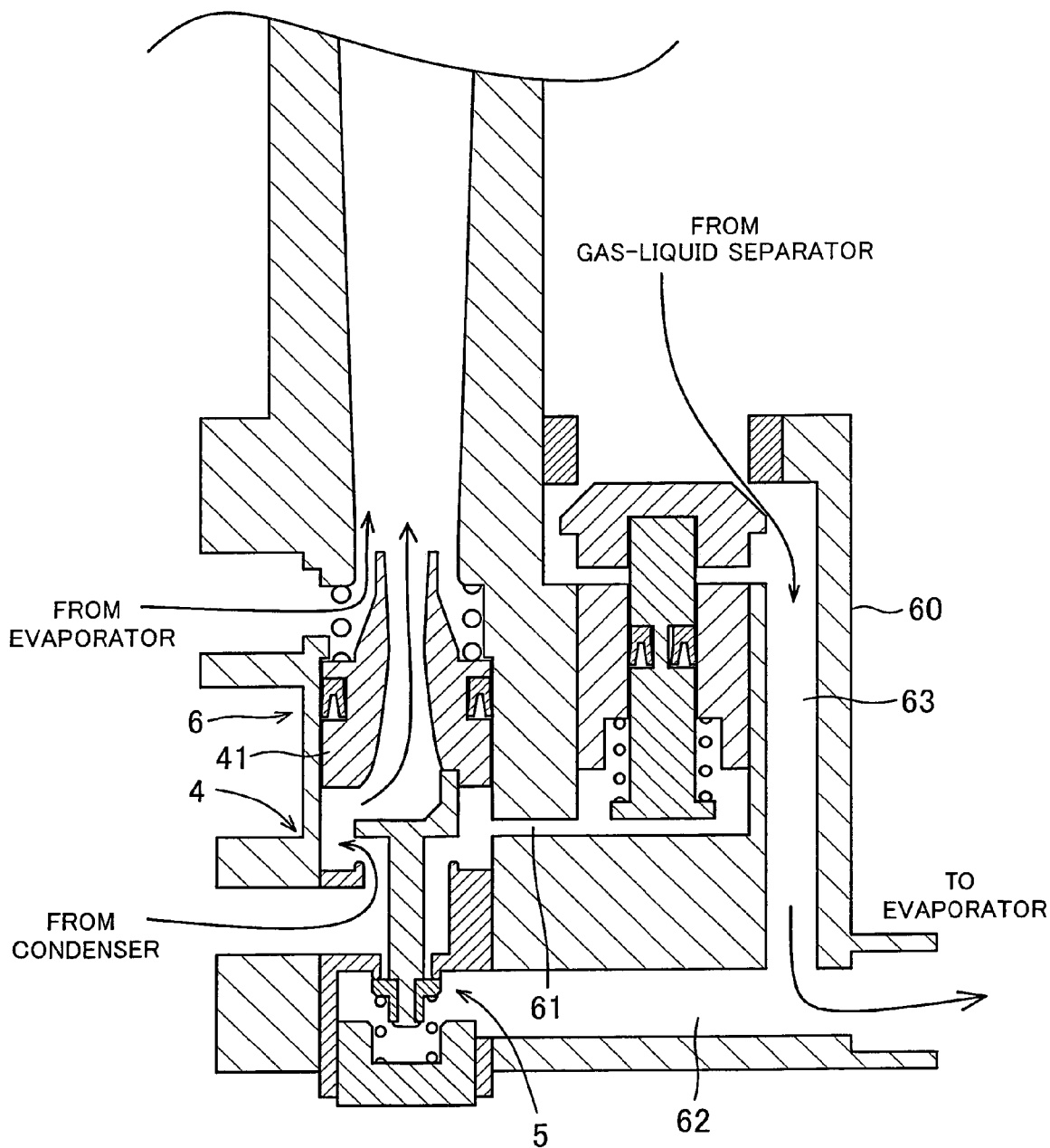
FIG. 12 is a cross-sectional view showing an example of the construction of a device in which switching valves, an ejector, a check valve, and a differential pressure valve are integrally formed with each other, in a state during normal operation.
Figure 13:
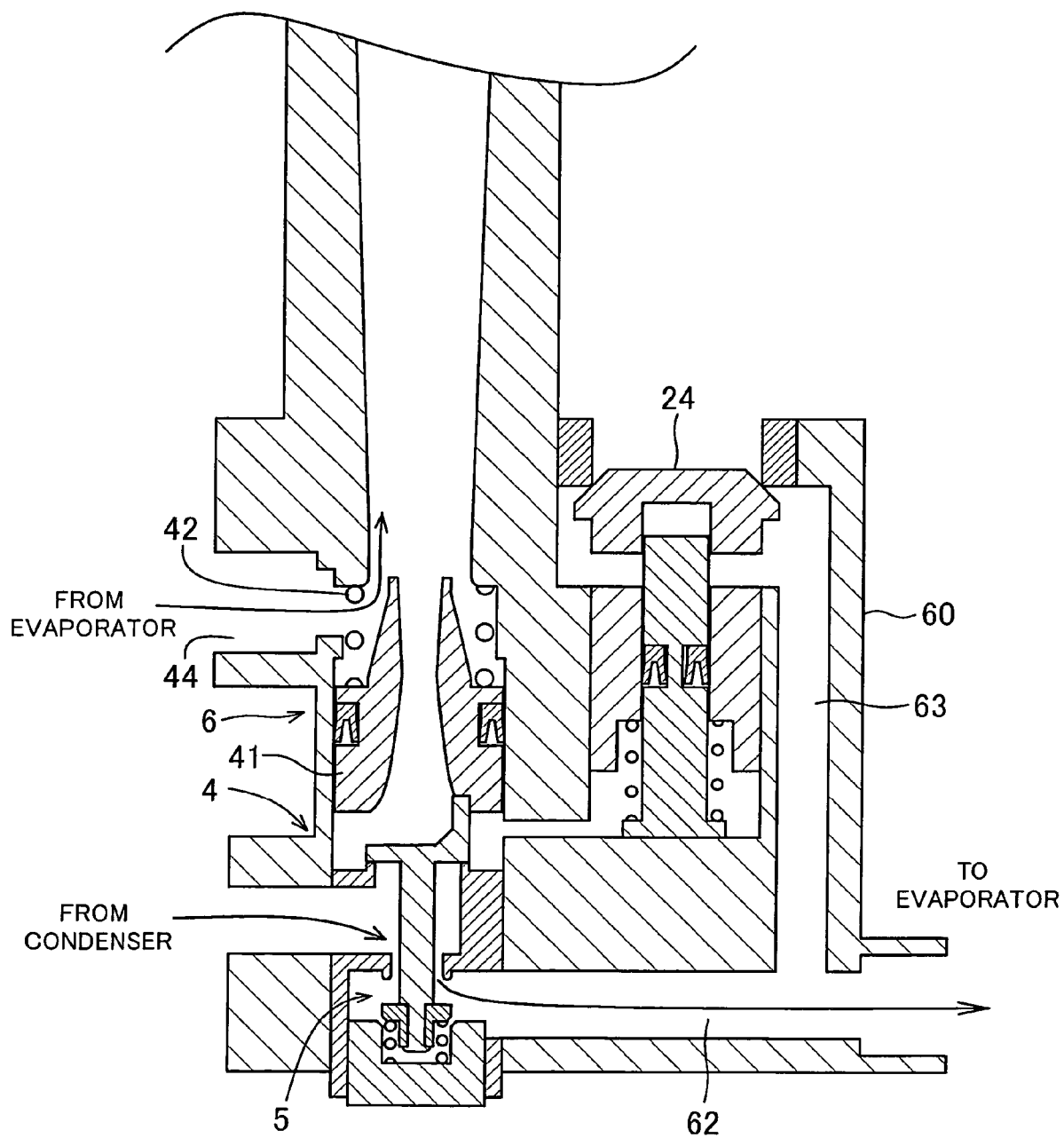
FIG. 13 is a cross-sectional view showing the example of the construction of the device in which the switching valves, the ejector, the check valve, and the differential pressure valve are integrally formed with each other, in a state during forcibly circulating operation.

FIG. 12 is a cross-sectional view showing an example of the construction of the device in which switching valves, an ejector, a check valve, and a differential pressure valve are integrally formed with each other, in a state during normal operation. FIG. 13 is a cross-sectional view showing the example of the construction of the device in which the switching valves, the ejector, the check valve, and the differential pressure valve are integrally formed with each other, in a state during forcibly circulating operation. It should be noted that in FIGS. 12 and 13, component elements having functions identical to or equivalent to those of the components shown in FIGS. 5, 6, 10, and 11 are designated by identical reference numerals.

According to this construction, the switching valves 4 and 5, the ejector 6, and a control valve comprised of the check valve 8 and the differential pressure valve 9 are accommodated in a common body 60. In the illustrated example, a space between the switching valve 4 and the nozzle 41 is connected to the control valve by a passage 61 formed within the body 60, whereby the pressure in the refrigerant inlet of the ejector 6 is introduced to the control valve, and a passage 62 on a downstream side of the switching valve 5 and a passage 63 on a downstream side of the control valve are caused to join into one within the body 60 to be connected to the evaporator 10.

This construction makes it possible to arranged individual components in a concentrated manner, so that the whole system can be made not only compact in size but also excellent in assemblability due to elimination of necessity of connecting the individual components by pipes or tubes, one by one, and reduced in the possibility of occurrence of refrigerant leakage through joint parts due to a largely reduced number thereof.

As shown in FIG. 12, during normal operation in which the differential pressure across the ejector 6 is not lower than the predetermined value, the switching valve 4 is opened by liquid refrigerant introduced from the condenser 3, and the switching valve 5 is closed according thereto. As a result, the introduced liquid refrigerant is caused to flow through the nozzle 41, and decompressed and expanded to be ejected from the forward end of the nozzle 41. At this time, gaseous refrigerant evaporated by the evaporator 10 is drawn in, mixed with a jet stream from the nozzle 41, reduced in flow speed by the diffuser to be pressurized or raised in pressure, and caused to flow out from the refrigerant outlet of the ejector 6 to the gas-liquid separator 7. In the evaporator 10 from which the gaseous refrigerant is drawn in by the ejector 6, liquid refrigerant is introduced for evaporation, via the control valve with a valve lift dependent on the differential pressure across the ejector 6, and the resulting gaseous refrigerant is sent to the ejector 6.

As shown in FIG. 13, during forcibly circulating operation in which the differential pressure across the ejector 6 is lower than the predetermined value, the switching valve 4 is closed and the switching valve 5 is opened, by the urging force of the spring 42. This causes liquid refrigerant from the condenser 3 to flow to the evaporator 10 via the switching valve 5, but the valve element 24 of the control valve is closed by the pressure of the liquid refrigerant. The refrigerant having flowed via the evaporator 10 enters the ejector 6 from the refrigerant inlet 44.

Figure 14:
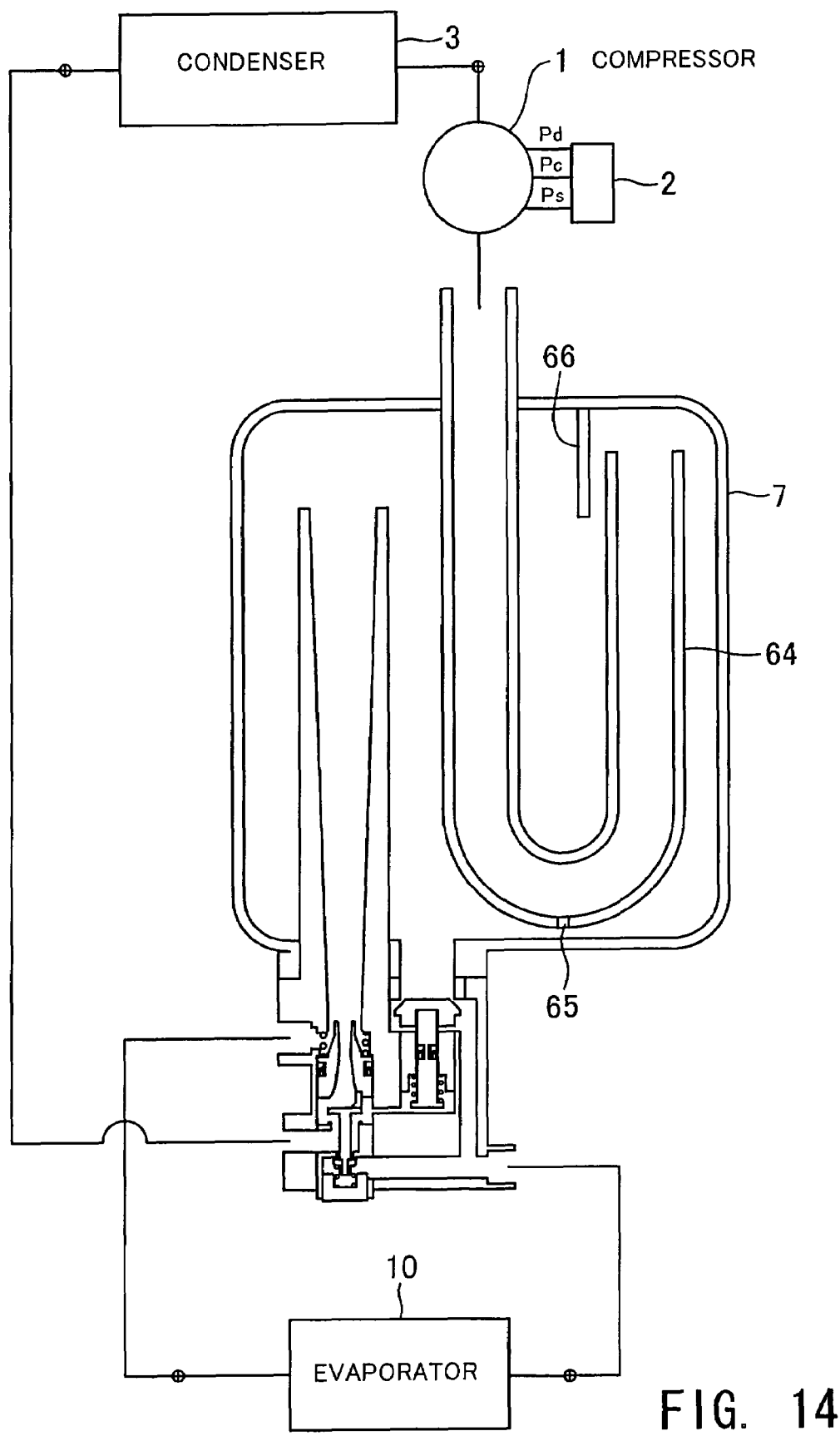
FIG. 14 is a system diagram showing an example of the arrangement of a refrigeration cycle in which switching valves, an ejector, a check valve, a differential pressure valve, and a gas-liquid separator are integrally formed with each other.

FIG. 14 is a system diagram showing an example of the arrangement of a refrigeration cycle in which switching valves, an ejector, a check valve, a differential pressure valve, and a gas-liquid separator are integrally formed with each other. It should be noted that in FIG. 14, component elements having functions identical to or equivalent to those of the components shown in FIG. 1 and FIG. 12 are designated by identical reference numerals, and detailed description thereof is omitted.

In this example of the arrangement of the system, the one-piece structure shown in FIG. 12 is configured to further integrate the gas-liquid separator 7. The gas-liquid separator 7 has an integral one-piece part comprised of the switching valves 4 and 5, the ejector 6, and the control valve including the check valve 8 and the differential pressure valve 9, disposed at a lower part thereof, such that a diffuser of the ejector 6 opens in an upper portion of the inside of the gas-liquid separator 7, whereby a one-piece construction is formed. The gas-liquid separator 7 has a U-shaped pipe 64 disposed therein, with one open end thereof connected to the suction port of the compressor 1, and the other open end thereof located in an upper portion of the interior of the gas-liquid separator 7, where gaseous refrigerant exists. The lowest portion of the U-shaped pipe 64 is formed with a bleed hole 65 such that when gaseous refrigerant passes through the U-shaped pipe 64 at high flow speed, the gaseous refrigerant draws up lubricant oil for the compressor 1 collected in the bottom of the gas-liquid separator 7 to supply the lubricant oil to the compressor 1. A baffle plate 66 is disposed around the open end of the U-shaped pipe 64 from which gaseous refrigerant is drawn.

As described above, out of component parts arranged in an engine room, the switching valves 4 and 5, the ejector 6, the control valve including the check valve 8 and the differential pressure valve 9, and the gas-liquid separator 7 are integrally formed with each other. This makes it possible to largely reduce the number of joint parts of piping, from which refrigerant can leak, thereby making it possible to improve assemblability to make the whole system compact in size.

The refrigeration cycle according to the present invention is capable of driving a compressor by an engine for driving an automotive vehicle, and therefore it is possible to provide an advantageous effect of reducing the cost of an automotive air conditioner.

The refrigeration cycle for an automotive vehicle, according to the present invention can be applied not only to ejector cycles using a CFC's substitute as refrigerant but also ejector cycles using any of various kinds of refrigerant, such as carbon dioxide.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A refrigeration cycle comprising an ejector that is capable of drawing evaporated refrigerant while decompressing cooled or condensed refrigerant,
and a swash plate variable displacement compressor for compressing the refrigerant,
wherein the variable displacement compressor comprises a capacity control valve that is responsive to a discharge pressure and a suction pressure of the compressor and is capable of controlling a differential pressure between the discharge pressure and the suction pressure to a predetermined differential pressure determined by an external signal.

2. The refrigeration cycle according to claim 1, comprising a differential pressure valve disposed between a gas-liquid separator and an evaporator such that a differential pressure across the differential pressure valve is approximately proportionally controlled to a differential pressure across the ejector.

3. The refrigeration cycle according to claim 2, wherein the differential pressure valve is a solenoid-driven differential pressure valve to which is set a required differential pressure by a current value determined from the differential pressure across the ejector estimated from the external signal determining the predetermined differential pressure.

4. The refrigeration cycle according to claim 3, wherein the differential pressure across the solenoid-driven differential pressure valve is set to approximately 0 when the current value is equal to 0.

5. The refrigeration cycle according to claim 2, comprising a check valve connected in series to the differential pressure valve, for allowing the refrigerant to flow only in a direction in which the refrigerant flows out from a liquid refrigerant outlet of the gas-liquid separator.

6. The refrigeration cycle according to claim 2, wherein a valve lift of the differential pressure valve is controlled according to the differential pressure across the ejector.

7. The refrigeration cycle according to claim 6, wherein the differential pressure valve comprises a piston that receives pressure from a refrigerant inlet of the ejector at one end thereof, and a valve that has a valve element provided on another end of the piston and has a valve lift thereof controlled according to the differential pressure across the ejector, due to pressure from the liquid refrigerant outlet of the gas-liquid separator, which urges the piston against the pressure from the refrigerant inlet of the injector, and at the same time urges the valve element in a direction of opening the valve, the pressure corresponding to pressure in a refrigerant outlet of the ejector.

8. The refrigeration cycle according to claim 7, wherein a spring is interposed between the piston and the valve element in order to reduce a pressure difference due to a difference between an effective pressure receiving area of the piston and an effective pressure receiving area of the valve element.

9. The refrigeration cycle according to claim 6, wherein the differential pressure valve comprises a piston that receives a pressure from a refrigerant inlet of the ejector at one end thereof, and a valve that has a movable valve seat provided at another end of the piston, and has a valve lift thereof controlled according to the differential pressure across the ejector, due to pressure from the liquid refrigerant outlet of the gas-liquid separator, which urges the piston against the pressure from the refrigerant inlet of the ejector, and at the same time urges the movable valve seat in a direction away from a valve element thereof, the pressure corresponding to pressure from a refrigerant outlet of the ejector.

10. The refrigeration cycle according to claim 2, comprising a switching valve for switching a refrigerant flow path such that the cooled or condensed refrigerant is caused to flow through the ejector when the differential pressure across the ejector is not lower than a predetermined value, whereas when the differential pressure across the ejector is lower than the predetermined value, the cooled or condensed refrigerant is caused to flow through a passage between the evaporator and the differential pressure valve.

11. The refrigeration cycle according to claim 10, comprising a check valve provided between the differential pressure valve and the gas-liquid separator, for allowing the refrigerant to flow only in a direction in which the refrigerant flows out from a liquid refrigerant outlet of the gas-liquid separator.

12. The refrigeration cycle according to claim 10, wherein the switching valve is a solenoid valve that performs switching based on the external signal controlling the differential pressure between the discharge pressure and the suction pressure of the compressor to the predetermined differential pressure.

13. The refrigeration cycle according to claim 10, wherein the switching valve is a mechanically-operated three-way valve that performs switching based on a value of the differential pressure across the ejector.

14. The refrigeration cycle according to claim 13, wherein the switching valve is integrally formed with the ejector.

15. The refrigeration cycle according to claim 14, wherein the switching valve is further integrally formed with the differential pressure valve.

16. The refrigeration cycle according to claim 15, wherein the switching valve is further integrally formed with the gas-liquid separator.

17. The refrigeration cycle according to claim 1, wherein the displacement control valve controls the flow rate of refrigerant at the discharge pressure which is discharged from the compressor and supplied to a crankcase, thereby controlling the pressure in the crankcase to a pressure corresponding to the displacement of the compressor such that the refrigerant displacement is held constant.

* * * * *